Aug. 26, 1924.   1,506,677
A. E. SHIPTON ET AL
PRODUCTION OF COLORED PICTURES ON GLASS SURFACES
Filed Oct. 18, 1923
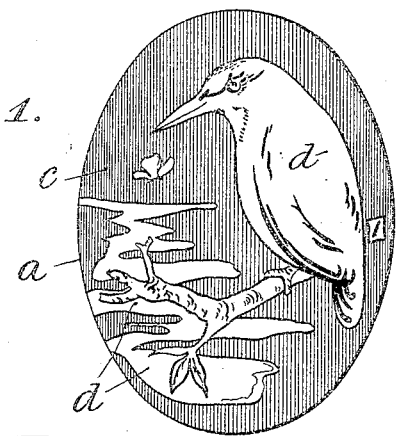
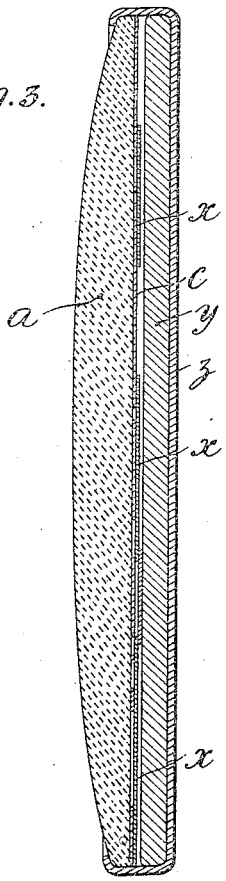
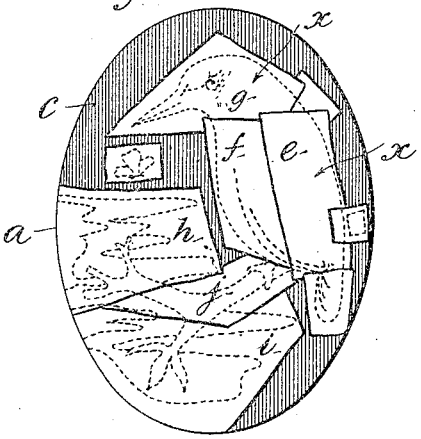
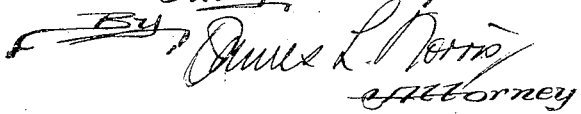

Patented Aug. 26, 1924.

1,506,677

UNITED STATES PATENT OFFICE.

ALBERT EDWARD SHIPTON, CAROLINE EMILY SHIPTON, AND AMY MARIA SHIPTON, OF BIRMINGHAM, ENGLAND.

PRODUCTION OF COLORED PICTURES ON GLASS SURFACES.

Application filed October 18, 1923. Serial No. 669,410.

*To all whom it may concern:*

Be it known that we, ALBERT EDWARD SHIPTON, CAROLINE EMILY SHIPTON, and AMY MARIA SHIPTON, all subjects of the King of Great Britain, residing at 31 Spencer Street, Birmingham, England, manufacturers, have invented certain new and useful Improvements in or Relating to the Production of Colored Pictures on Glass Surfaces, of which the following is a specification.

The invention relates to the production of colored pictures on glass sheets or surfaces.

It has previously been proposed to interpose natural butterfly wings between a stiff backing, such as metal, and a transparent cover, such as glass or celluloid, in the production of articles of jewelry, trinkets and fancy goods.

According to this invention real butterfly wings are used for the production of colored pictures on glass sheets or surfaces, by first painting or otherwise fixing a view or subject upon the back of a glass sheet so as to provide transparent or substantially transparent portions or spaces forming essential portions of such view or subject and subsequently filling in said portions or spaces with real butterfly wings applied against the back of such view or subject so as to show through the transparent portions or spaces and the glass sheet to give to the said spaces or portions the desired color effects.

Views of land-scape, sea-scape, flowers, birds, animals, human figures and other subjects can be treated in the manner just indicated to constitute colored pictures, and particularly by producing, or blocking out, outlines forming the spaces which in themselves constitute the real outline of the view or subject, which spaces are then filled in by the real butterfly wings applied at the back of the glass sheet.

The invention is represented by the accompanying drawings applied to the simple subject of a bird.

Fig. 1. represents a back view of the glass sheet showing how the blank spaces are left.

Fig. 2. shows a similar back view with real butterfly wings applied to the blank spaces to fill them in.

Fig. 3. is a vertical section through the finished picture.

The glass sheet $a$ is of clear glass to start with, and the back of it is painted, or otherwise treated or decorated, as shown by the tinting $c$, to outline the blank spaces $d$ which represent the real features of the picture, which spaces are partly decorated by painting or otherwise for effect but are nevertheless transparent or substantially transparent spaces. Said spaces are then filled in with real butterfly wings $x$ applied against the back of the glass sheet in manner substantially represented by Fig. 2; for example, the piece $e$ may be of predominating red color, the pieces $f$ of blue, the piece $g$ of gold and the pieces $h$ and $i$ of blue, while the piece $j$ may also be of gold, all showing through the spaces to the front face of the glass piece wonderful color effects having gradations and patternings otherwise unobtainable.

In Fig. 3 a backing $y$ and a mount $z$ are applied to hold the butterfly wings in position against the spaces, but this view is rather exaggerated for clearness in illustration, it being understood that the backing comes quite close and imprisons the wings against the back of the glass sheet $a$.

Having now described our invention what we claim and desire to secure by Letters Patent is:—

A colored picture comprising a transparent glass sheet, a view or subject fixed upon the back of said sheet so as to leave definite transparent spaces forming material parts of the view or subject, butterfly wings applied to the transparent spaces and to the back of the glass sheet to give thereto color effects, and a backing secured to said plate behind said view or subject and said butterfly wings substantially as described.

In testimony whereof we have hereunto set our hands in presence of two subscribing witnesses.

ALBERT EDWARD SHIPTON.
CAROLINE EMILY SHIPTON.
AMY MARIA SHIPTON.

Witnesses:
JOHN P. FUERY,
MURIEL A. WHATTON.